United States Patent [19]

Hall

[11] Patent Number: 4,908,083
[45] Date of Patent: Mar. 13, 1990

[54] IMPACT-RESISTANT LAMINATE

[75] Inventor: Christopher W. G. Hall, Redditch, England

[73] Assignee: Pilkington PLC, St. Helens, England

[21] Appl. No.: 114,405

[22] Filed: Oct. 29, 1987

Related U.S. Application Data

[63] Continuation-in-part of Ser. No. 22,521, Mar. 9, 1987, abandoned, which is a continuation of Ser. No. 879,498, Jun. 24, 1986, abandoned, which is a continuation of Ser. No. 718,271, Apr. 1, 1985, abandoned.

[30] Foreign Application Priority Data

Apr. 4, 1984 [GB] United Kingdom ............... 8408664
Jan. 8, 1985 [GB] United Kingdom ............... 8500471

[51] Int. Cl.$^4$ .................. B32B 17/00; C03C 27/00; G02C 7/00
[52] U.S. Cl. ...................... 156/99; 428/332; 428/442; 428/425.6; 428/447; 428/524; 156/106; 156/329; 156/107
[58] Field of Search .............. 428/332, 412, 425.6, 428/524, 447; 156/99, 106, 329, 107

[56] References Cited

U.S. PATENT DOCUMENTS 4,230,769 10/1980 Goossens .
4,328,277 5/1982 Molari, Jr. .

FOREIGN PATENT DOCUMENTS

| 0130866 | 1/1986 | European Pat. Off. . |
| 2134255 | 12/1972 | France . |
| 2181635 | 12/1973 | France . |
| 2185040 | 12/1973 | France . |
| 2322106 | 3/1977 | France . |
| 1142817 | 2/1969 | United Kingdom . |
| 1221285 | 2/1971 | United Kingdom . |
| 1305624 | 2/1973 | United Kingdom . |
| 1504198 | 3/1978 | United Kingdom . |
| 1524625 | 9/1978 | United Kingdom . |
| 2011836 | 7/1979 | United Kingdom . |
| 2098650 | 11/1982 | United Kingdom . |
| 80/01051 | 5/1980 | World Int. Prop. O. . |
| 80/01052 | 5/1980 | World Int. Prop. O. . |

Primary Examiner—P. C. Ives
Attorney, Agent, or Firm—Burns, Doane, Swecker & Mathis

[57] ABSTRACT

An impact-resistant laminate has adhered to a rear glass face, opposite to the face which receives the impact, a polycarbonate sheet up to about 3 mm thick which is sufficiently thin to conform to the rear glass face and to be adhered thereto without preforming. Preferably the thickness of the polycarbonate sheet is in the range about 0.25 mm to about 0.64 mm, and it has an abrasion-resistant self-healing coating. The laminate may include toughened or annealed glass sheets.

3 Claims, 2 Drawing Sheets

IMPACT-RESISTANT LAMINATE

CROSS-REFERENCE TO RELATED APPLICATIONS

This application is a continuation-in-part of co-pending Application Ser. No. 22,521 (now abandoned) filed Mar. 9, 1987 which is a continuation of Application Ser. No. 879,498 filed June 24, 1986, now abandoned, which itself is a continuation of Application Ser. No. 718,271, filed Apr. 1, 1985, now abandoned.

BACKGROUND TO THE INVENTION

1. Field of the Invention

This invention relates to impact-resistant laminates, and in particular to impact-resistant window panels which embody at least one glass sheet. Some such panels are bullet-resistant and resist bullets or other high energy impacts with little or no spalling from the rear face of the panel opposite to the face which receives the impact. Other such panels are "anti-vandal" panels which resist manual attack with weapons such as hammers or pick handles, and impacts of stones and bricks, but do not necessarily resist bullets.

2. Description of the Prior Art

Prior proposals for bullet-resistant glass laminates, and anti-vandal glass laminates usually either accepted the risk of spall from a rear glass face of the laminate or have included a rear plastics sheet, for example a thick polycarbonate or stretched acrylic sheet which is adhered to the rear glass face to combat spall.

In one example of use of the laminate as a vehicle window panel, the front sheet which receives the impact is a glass sheet and the rear sheet which is inside a vehicle is a thick polycarbonate sheet which is ductile and has good resistance to spalling. Impact-resistant laminates often comprise a number of glass sheets which are laminated together with a rear polycarbonate sheet which provides good resistance to spalling.

GB 1 504 198 describes an impact resistant laminate comprising a number of glass sheets with a rear sheet made of polycarbonate having a brittle scratch-resistant coating on its exposed face. The tendency of the polycarbonate sheet to spall, due to some extent to the brittle nature of the protective layer, is said to be reduced by reducing the thickness of the polycarbonate sheet to a thickness in the range 0.76 to 5.6 mm, and the results given indicate that under certain conditions of "medium power" impact the laminate functions satisfactorily.

In GB 2 011 836 A there is a proposal for an improved impact resistant laminate, which resists a single shot, and which comprises a number of sheets of glass which are adhered together by means of transparent plastics interlayers which serve as the impact shock receiving layers of the laminate. These laminated glass sheets are mounted in a frame and are separated by an air space from a polycarbonate sheet 9.5 mm thick to which a scratch-resistant coat of self-healing polyurethane is applied.

GB 1 394 271 describes laminated glass windshields for vehicles. The windshield may comprise a glass sheet, a sheet of plastically deformable layer, for example polyvinylbutyral, adhered to the glass, and a composite structure adhered to the polyvinylbutyral. The composite structure may comprise a reinforcing sheet 0.1 to 0.2 mm thick, with a protective layer of self-healing polyurethane. A number of materials are suitable for the reinforcing sheet, for example an amorphous polyamide or copolyamide, a cellulose acetobutyrate or triacetate, a polycarbonate, an ionomer or a polyester. The total thickness of the windshield would be about 4 mm.

FR 2181635 discloses the use of a polyurethane coating 0.75 mm to 3.8 mm thick, but preferably at least 1.27 mm thick, as anti-spall shield to prevent spall from glass or plastics, particularly polycarbonate. The polyurethane layer is protective cladding and accordingly requires a relatively large thickness of from 0.75 mm to 3.8 mm to act as an effective anti-spall shield.

EP 0130886 discloses bullet-proof glazing wherein a polycarbonate sheet is adhered to a rear surface of a glass sheet. The polycarbonate sheet preferably has a thickness of between 2 mm and 5 mm. A self-healing coating is adhered to the polycarbonate sheet by an adhesive coating of polyurethane. In preferred embodiments, the thickness of the self-healing coating is 0.5 mm when applied to polycarbonate sheet 2 mm thick.

GB 1142817 discloses a laminated safety pane comprising a layer of polycarbonate 0.5 to 2 mm thick adhered by a layer of clear adhesive 0.05 to 1 mm thick to a glass pane 2.5 to 7 mm thick. The polycarbonate is used to provide impact strength and is not used as an anti-spall layer. There is also no suggestion that the polycarbonate sheet could be effective as an anti-spall layer.

GB 1221285 discloses a vehicle windscreen having an inner sheet of plastics, which can be polycarbonate, which is of smaller overall dimensions than the glass enabling the windscreen to shear around its edge on head impact. The polycarbonate layer is used in place of a glass inner layer to stop the head of a passenger penetrating a glass layer on impact.

The use of a polycarbonate or stretched acrylic sheets as the rear impact resistant ply of a laminated window panel has added considerably to the cost of the laminate. In some cases the risk of spall from a rear glass sheet has been tolerated, rather than incurring the additional cost of such a rear ply.

The Inventor has found that a thin polycarbonate sheet having an outer self-healing coating can act as an effective spall-resistant rear lamina when adhered to a rear glass face of an impact-resistant laminate, in particular an impact-resistant window panel.

Further the Inventor has provided a solution to the problem of the effective application of a self-healing abrasion-resistant anti-spall shield to the rearmost glass face of a curved glass laminate, for example for use as impact resistant window panels for aircraft and railway locomotives, or as anti-vandal windows for automobiles.

SUMMARY OF THE INVENTION

According to the invention there is provided a curved, laminated, impact-resistant panel having a glass sheet having a front face and a rear face which is opposite to the face of the panel which receives the impact, and a polycarbonate sheet up to about 1 mm thick which is adhered to the rear face of said glass sheet without preforming to match the conformation of the glass sheet, and which carries a self-healing coating of thickness of from about 0.1 mm to about 0.5 mm.

The invention further provides a curved, laminated, impact-resistant panel at least 6 mm thick, comprising a number of glass sheets which are preformed to a matching curvature and are laminated together, with a polycarbonate sheet up to about 1 mm thick adhered to the preformed rear glass face of the glass sheet opposite to the glass sheet which receives the impact, said polycarbonate sheet being sufficiently thin to be adhered without preforming to said preformed rear glass face, and said polycarbonate sheet carrying an outer self-healing coating.

The invention still further provides a laminated, impact-resistant panel having a rear glass sheet opposite to the face which receives the impact, and a polycarbonate sheet which is not more than about 0.64 mm thick and is adhered to the rear glass face of said rear glass sheet, which polycarbonate sheet has an abrasion-resistant, self-healing coating at least 0.25 mm thick.

The invention further provides a curved, laminated, impact-resistant panel having a rear glass sheet opposite to the face which receives the impact, and a polycarbonate sheet which is about 0.5 mm thick and which is adhered to said rear glass face of said rear glass sheet without preforming to match the conformation of said rear glass face, which polycarbonate sheet carries an abrasion-resistant, self-healing coating about 0.25 mm thick.

The invention also provides a method of producing a curved, laminated, impact-resistant panel comprising laminating together a preformed curved glass sheet which is to be the impact-receiving front glass sheet of the panel and a preformed curved glass sheet whose curvature matches the curvature of said front glass sheet, which curved glass sheet is to be the rear sheet of the laminate; and adhering to said preformed curved rear glass face a thin flexible polycarbonate sheet which carries a self-healing coating, without preforming said thin flexible polycarbonate sheet.

The polycarbonate sheet may be thicker than 0.64 mm, e.g. up to about 1 mm thick, so long as it is sufficiently flexible to be adhered to the curved rear face of the rearmost preformed glass sheet of the laminate, without preforming of the polycarbonate sheet carrying its self-healing coating to match the conformation of the rear glass face of the laminate. The maximum thickness will depend on the curvature of the laminate. With laminates of low curvature, thicker polycarbonate may be used; with highly curved laminates, the thickness of the polycarbonate sheet will generally be at the lower end of the range.

The invention still further provides a composite lamina comprising a polycarbonate sheet about 0.25 mm to about 0.64 mm thick having a self-healing polyurethane coating from about 0.1 mm to about 0.5 mm thick on one face thereof.

Some embodiments of the invention comprise a number of glass sheets which are preformed to a matching curvature with the unpreformed polycarbonate sheet adhered to the rear face of the glass sheet opposite to a glass sheet which receives the impact.

The front sheet of glass which receives the impact may be a strengthened glass sheet.

For example, for use as a windscreen panel in a railway locomotive the front sheet of glass may be an annealed or a semi-toughened sheet which, on impact, fractures in a manner which does not substantially impair vision through the laminate. Such a laminate for a locomotive windscreen panel would comprise an annealed or a semi-toughened front glass sheet bonded by a polyvinylbutyral interlayer to a rear sheet of annealed glass to the rear face of which the polycarbonate sheet is adhered.

In another form of the invention the laminate may comprise an anti-vandal window panel for use in an automobile, which laminate comprises two sheets of toughened glass bonded together by an interlayer of polyvinylbutyral with the polycarbonate sheet adhered to the rear face of the rear toughened glass sheet.

Another form of anti-vandal panel according to the invention comprises a sheet of fully toughened glass at least 3 mm thick with the polycarbonate sheet adhered to the rear face of the sheet.

BRIEF DESCRIPTION OF THE DRAWINGS

Referring to FIG. 1 of the drawings, a bullet-resistant glass laminate comprises an outer sheet 1 of annealed glass about 12 mm thick whose face 2 receives the impact of a bullet. The sheet 1 is bonded to a second glass sheet 3 of annealed glass about 12 mm thick, by means of an interlayer 4 of soft polyvinylbutyral about 1.5 mm thick. A sheet 5 of annealed glass about 10 mm thick is bonded to the sheet 3 by a second interlayer 6 of soft polyvinylbutyral. The rear glass face 7 of the sheet 5 opposite to the glass face 2 which receives the impact has adhered to it by means of a thin layer of a thermoplastic polyester based polyurethane 8, a composite lamina consisting of a polycarbonate sheet 9 which is about 0.5 mm thick with an outer coating 10 of self-healing polyurethane which is about 0.5 mm thick. The outer coating 10 of self-healing polyurethane provides a relatively soft exposed surface which acts as a scratch-resistant layer. When the face 2 of the laminate was hit by a bullet from a 7.62 Parker Hale T4 target rifle under normal atmospheric temperature conditions at a range of 30 m, it was found that all the glass sheets were broken and the energy of the bullet was fully absorbed in the glass breakage with only a slight bulge in the polycarbonate sheet 9. Further it was found, surprisingly, that up to four more bullets could be fired at different target points on the already broken laminate with no appreciable spalling from the rear face, although a bulge of the polycarbonate sheet 9 appeared at each position. At the target position of the fifth bullet there was a small rupture of the composite lamina but still no appreciable spalling. This construction with the thin polycarbonate spall barrier therefore surprisingly could resist up to three other bullets after initial breakage, without spalling from the rear face.

The polycarbonate sheet 9 of the composite lamina is so thin that, in the manufacture of the bullet-resistant laminate, in the manner described with reference to FIG. 8, the polycarbonate sheet 9 with its self-healing coating 10 can be adhered to the rear glass face 7, by means of the polyurethane layer 8, without preforming to match any curved conformation of the rear glass face. Because preforming of the polycarbonate sheet 9 is unnecessary, the manufacturing process is simplified, and losses which would be associated with a preforming process involving heating and bending, which would be required with a thicker rear polycarbonate sheet, are avoided.

Figure 1:
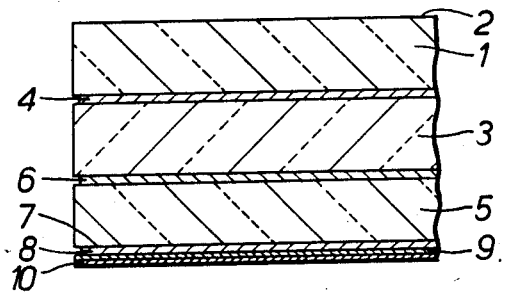
FIG. 1 is a sectional view through one edge of an impact-resistant glass laminate which is a bullet-resistant window, with an inner self-healing coating.
Figure 2:
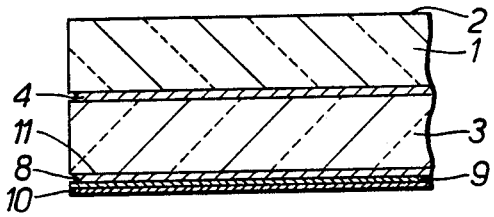
FIG. 2 is a sectional view through one edge of another bullet-resistant window panel.

FIG. 2 illustrates another bullet-resistant glass laminate which is capable of resisting medium power bullets without spalling. This laminate comprises two sheets 1 and 3 of annealed glass about 12 mm thick bonded together by polyvinylbutyral interlayer 4. The composite polycarbonate lamina comprising an about 0.5 mm thick polycarbonate sheet 9 with its about 0.5 mm thick outer coating 10 of self-healing polyurethane is adhered to the rear face 11 of the glass sheet 3 by means of a layer 8 of the thermoplastic polyester-based polyurethane. This laminate was subjected to test under normal ambient conditions using a 7.62 self-loading rifle at a range of 30 m. All the glass was broken but there was no penetration and no spalling from the rear face of the laminate. Similar results were obtained with a laminate of this kind which omitted the self-healing outer coating 10.

Figure 3:
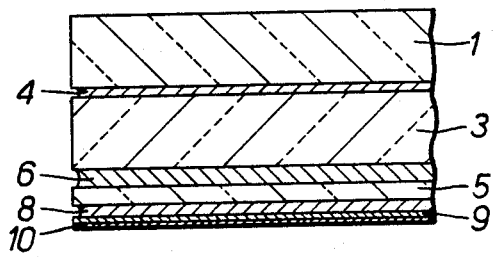
FIG. 3 is a sectional view through one edge of yet another bullet-resistant window panel according to the invention.

FIG. 3 illustrates yet another form of bullet-resistant glass laminate consisting of an outer annealed glass sheet 1 which is about 12 mm thick, and is laminated to a second annealed glass sheet 3 by a polyvinylbutyral interlayer 4 which is about 1.5 mm thick. A third sheet 5 of annealed glass which is about 3 mm thick is laminated to the sheet 3 by an about 3 mm thick layer 6 of polyvinylbutyral. The inner spall barrier is provided by a composite lamina consisting of a polycarbonate sheet 9 which is about 0.5 mm thick with an outer coating 10 of self-healing polyurethane which is about 0.25 mm thick. This lamina is adhered to the rear face of the glass sheet 5 by a layer 8 of thermoplastic polyester-based polyurethane which is about 2 mm thick. This about 2 mm polyurethane layer improves the effectiveness of the composite lamina 9, 10 as a spall barrier; it is believed to operate by spreading the load area when the glass sheets break upon impact by a bullet. The bullet-resistant glass laminate of FIG. 3 may be used as glazing for an automobile.

Figure 4:
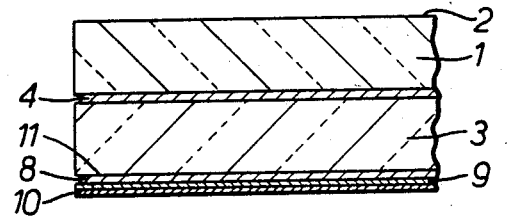
FIG. 4 is a sectional view through one edge of yet another bullet-resistant window panel according to the invention.

FIG. 4 illustrates a further embodiment of a laminated, impact-resistant panel in accordance with the present invention. The laminate is similar to that of FIG. 2, but with a modification to the thickness of the self-healing polyurethane coating 10. The laminate comprises two sheets 1 and 3 of annealed glass about 12 mm thick bonded together by a polyvinylbutyral interlayer 4. A composite polycarbonate lamina comprising an about 0.5 mm thick polycarbonate sheet 9 with an about 0.1 mm thick outer coating 10 of self-healing polyurethane is adhered to the rear face 11 of the glass sheet 3 by means of a layer 8 of the thermoplastic polyester-based polyurethane. For the sake of clarity of illustration, the thickness of the self-healing coating 10 is not shown to the same scale as the remainder of the laminate.

The inventor has found that a self-healing polyurethane outer coating 10 of the thickness as small as about 0.1 mm provides effective scratch-resistance to the rear face of the polycarbonate layer 9. Such a self-healing outer coating 10 of thickness about 0.1 mm can be used in any of the other illustrated embodiments to provide effective scratch-resistance, although for certain applications a thicker self-healing polyurethane outer coating may be desirable.

Figure 5:
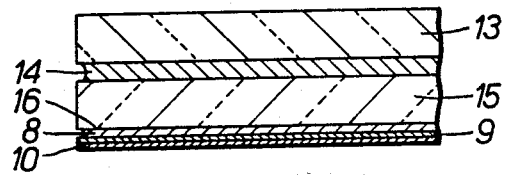
FIG. 5 is a sectional view through one edge of an impact-resistant laminate intended for use as a panel of a locomotive windscreen.

FIG. 5 illustrates an impact-resistant glass laminate for use as a windscreen panel of a railway locomotive. Such windscreens may be struck by a bullet but more usually by other missiles with sharp corners or edges such as flying stones. It is important for the driver of the locomotive to have visibility after the impact and also for the outer sheet to be of maximum possible strength. For this reason the outer glass sheet 13 would usually be of strengthened glass and in the embodiment illustrated is a thermally toughened glass sheet about 8 mm thick which is semi-toughened to a degree such that, after fracture, vision through the laminate is not substantially impaired. The outer sheet 13 is bonded by a thick polyvinylbutyral interlayer 14, about 3 mm thick, to an annealed glass sheet 15, about 8 mm thick, which forms the rear sheet of the glass laminate and to whose rear face 16 a polycarbonate sheet 9 having an outer coating 10 of self-healing polyurethane is bonded by a thin layer of the thermoplastic polyester-based polyurethane 8. The polycarbonate sheet 9 is about 0.5 mm thick and the self-healing coating 10 is about 0.25 mm thick and prevents scratching and maintains visibility under usual working conditions in which the locomotive driver would from time-to-time wipe clean the inner surface of the windscreen. The thick polyvinylbutyral interlayer 14 serves as a strong elastic membrane to prevent a heavy missile such as a stone entering the driving compartment of the locomotive if the front glass sheet 13 is broken by the stone. Even though the inner glass sheet 15 is broken as well, the thin polycarbonate sheet 9 prevents spalling.

In this embodiment of the invention, and other embodiments which incorporate a thick polyvinylbutryal or other extensible plastics interlayer, the polycarbonate sheet may be thinner than 0.64 mm, for example about 0.5 mm or even less. However, subject to the requirement that the coated polycarbonate sheet 9 can be adhered to the rear glass face of the laminate without preforming, it may be a thicker sheet, for example up to 1 mm thick, depending on the curvature of the laminate.

Figure 6:
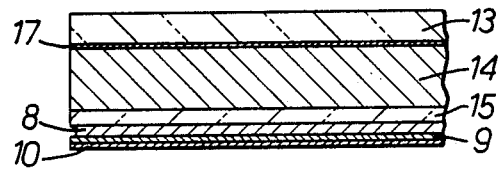
FIG. 6 is a view similar to FIG. 5 of another locomotive window panel according to the invention, with thick energy-absorbing layers.

FIG. 6 illustrates another form of impact resistant glass laminate for use as a windscreen panel of a railway locomotive. The outer glass sheet of the laminate 13 is a semi-toughened glass sheet about 5 mm thick which carries a heating film 17. This outer sheet 13 is bonded by a thick layer 14 of soft polyvinylbutyral from about 9 to about 11 mm thick, to an annealed glass sheet 15 which is from about 2 to about 3 mm thick and which forms the rear sheet of the glass laminate. To the rear face of the annealed glass sheet 15 the composite lamina, comprising a polycarbonate sheet 9, about 0.5 mm thick, with an outer coating 10 of self-healing polyurethane, about 0.25 mm thick, is bonded by a layer 8 of thermoplastic polyester based polyurethane which is about 2 mm thick. In the same way as in the embodiment of FIG. 3 this about 2 mm thick polyurethane layer 8 improves the effectiveness of the spall barrier constituted by the composite lamina 9, 10.

Figure 7:
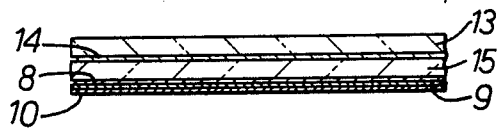
FIG. 7 is a sectional view through one edge of another laminate intended for use as an anti-vandal automobile window.

FIG. 7 illustrates another impact-resistant laminate of the invention which is a light weight "anti-vandal" glass such as can be employed for the window panels of vehicles.

The laminate comprises an outer glass sheet 13 which has a thickness in the range about 3 mm to about 4 mm and is bonded by an interlayer 14 of polyvinylbutyral of thickness in the range about 0.75 mm to about 1.5 mm, to an inner glass sheet 15 whose thickness is in the range about 3 mm to about 4 mm. The glass sheets 13 and 15 may be annealed or toughened. The rear face of the sheet 15 has adhered to it by means of a thin layer 8 of the thermoplastic polyether-based polyurethane, a composite lamina comprising an about 0.5 mm thick polycarbonate sheet 9 with an outer coating 10 of self-healing polyurethane which is about 0.25 mm to about 0.5 mm thick.

The laminae of FIG. 7 provides some bullet-resistance and is effective in protecting the occupants of a vehicle from spalling if the outer sheet 13 is struck with an instrument such as a hammer or a revolver butt.

Figure 8:
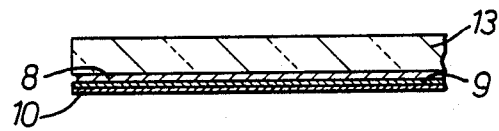
FIG. 8 is a view similar to FIG. 7 of another form of lightweight anti-vandal window panel.

FIG. 8 illustrates a simpler form of impact-resistant glass window panel according to the invention for use an an anti-vandal glass in vehicles for example. This panel provides some resistance to manual attack. The laminate comprises an outer sheet 13 of toughened glass which is from about 3 to about 8 mm thick, typically 6 mm thick. The polycarbonate sheet 9 which is about 0.5 mm thick, is adhered to the rear face of the glass sheet 13 by a layer of thermoplastic polyether-based polyurethane 8 which is about 1.25 mm thick. The toughened outer glass sheet may be a thinner or a thicker sheet, for example in the range of about 3 mm to about 8 mm thick, and the thickness of the polycarbonate sheet may be in the range of about 0.25 mm to about 1 mm, depending on the degree of security being sought. The polycarbonate sheet 9 has an outer abrasion-resistant coating, for example of self-healing polyurethane about 0.25 mm thick.

The thin layer 8 of thermoplastic polyurethane may be about 0.5 mm thick in each of the embodiments in which a thickness has not been specified. This thickness is sufficient to bond the polycarbonate sheet 9 to the rear glass face, and to take up any thermal expansion stresses. A thicker layer of thermoplastic polyurethane, for example in the range about 1.5 mm to about 4 mm may be used if desired, such as the 2 mm thick layer of FIGS. 5 and 7, and such thicker polyurethane layer contributes usefully to the impact performance of the laminate, as it is believed to spread the load area on the polycarbonate when the glass sheet breaks upon impact by a bullet.

Instead of using a thermoplastic polyurethane for the layer 8, a layer of another compatible thermoplastic adhesive of similar thickness may be used, for example a silicone resin adhesive.

The glazing for an automobile is often of special preformed curved shape, that is a laminate constructed according to FIG. 3 is often of a pre-formed curved shape. The coated polycarbonate sheet 9, 10 in thin flexible form may be in the form of a film about 1 mm thick or less and can be stored and supplied as a roll. The coated polycarbonate sheet readily adheres to the already shaped glass of the laminate without any special shaping process being necessary for pre-shaping the spall resistant Polycarbonate sheet to conform to the shape of the main part of the laminate.

The use of the composite lamina 9, 10 has the advantage that this outer film can be applied to a preformed curved laminate without itself needing to be preformed. The thin, flexible film is simply adhered to the preformed rear glass sheet.

Figure 9:
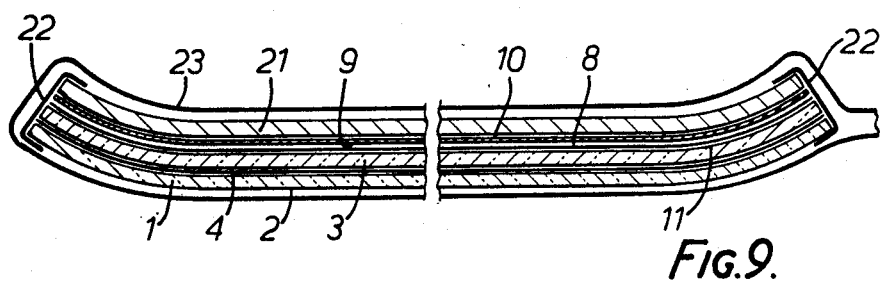
FIG. 9 illustrates diagrammatically one way of manufacturing a curved, laminated, impact-resistant window panel according to the invention.

FIG. 9 illustrates diagrammatically one way of manufacturing a curved laminated impact resistant panel for use as a bullet-proof windshield for an automobile.

The two sheets of annealed glass 1 and 3 which are about 12 mm thick are preformed conventionally to the required curvature as indicated diagrammatically in FIG. 9.

Lamination then begins with the preformed front glass sheet 1 face-downwards. A sheet 4 of polyvinylbutyral about 1.5 mm thick is draped into the front glass sheet 1, and the second preformed glass sheet 3 is placed face-downwards on to the polyvinylbutyral interlayer 4. The main preformed impact resistant constituents of the laminate have thus been assembled with their appropriate interlayer materials, and these constituents could then be laminated together to produce the main structure of the windshield before application of the thin flexible polycarbonate sheet 9 carrying the self-healing coating 10.

In the preferred method, the thin flexible polycarbonate 9 carrying the self-healing coating 10, is applied by adhering to the preformed curved rear glass face of the rear glass sheet 3, during the lamination. The thin flexible polycarbonate sheet 9 is about 0.5 mm thick and the self-healing polyurethane coating 10 is about 0.5 mm thick.

Firstly, a sheet 8 of thermoplastic polyether-based polyurethane which is about 0.6 mm thick is draped into the preformed rear glass sheet 3. Then a sufficiently large thin flexible duplex sheet 9, 10 is cut from the roll, and is draped without preforming over the polyurethane adhesive sheet 8.

A tooling sheet 21, which is preformed to the appropriate windshield curvature, is then placed on to the composite lamina 9, 10 and the whole assembly is edge-taped as indicated at 22, and is placed in an airtight bag 23 and subject to a vacuum in conventional manner.

The evacuated assembly is then autoclaved conventionally, for example for about 2 hours at a temperature of about 120° C. to 135° C. while a reduced pressure of about $6 \times 10^5$ Pa is maintained on the bag 23. The adhesion of the constituents of the panel occurs during this process, including the adhesion of the thin flexible polycarbonate sheet 9 to the preformed curved rear glass face of the rear glass sheet 3. This adhesion takes place without the introduction of any detrimental stress into the thin polycarbonate sheet 9, such as could otherwise be detrimental to the integrity both of the sheet 9 and the self-healing coating 10 which it carries, during the subsequent life of the bullet-proof windshield.

The invention may also be applied to a glass laminate for use as architectural glass having adhered to its rear glass face the composite lamina, already described, of thin polycarbonate sheet with an outer coating of self-healing polyurethane.

The self-healing coating 10 may be of an abrasion-resistant, self-healing polyurethane of the kind described in GB 2 011 836 A or GB 2 070 045 A. This self-healing coating is preferably 0.25 mm to 0.50 mm thick.

While some embodiments of this invention have been illustrated and described, it is understood that various modifications and changes will become obvious to those skilled in the art. Such modifications and changes may be made without departing from the true scope and spirit of this invention.

I claim:

1. A method of producing a curved, laminated impact-resistant panel comprising laminating together a plurality of glass sheets which are preformed to a curved shape and including an exposed front glass sheet and a rear glass sheet; and adhering to the rear glass face of the rear glass sheet a thin flexible polycarbonate sheet up to about 1 mm thick, which carries a self-healing polyurethane coating up to about 0.5 mm thick, to match the curvature of the preformed rear glass face of the rear glass sheet without preforming said thin flexible polycarbonate sheet.

2. A method as claimed in claim 1, wherein the thickness of said self-healing polyurethane coating is in the range of about 0.25 mm to about 0.5 mm.

3. A method as claimed in claim 1, wherein the thickness of said self-healing polyurethane coating is from about 0.1 mm to about 0.5 mm.

* * * * *